(12) United States Patent
Wood et al.

(10) Patent No.: US 8,577,525 B2
(45) Date of Patent: Nov. 5, 2013

(54) SHALLOW WATER HIGHLIGHT METHOD AND DISPLAY SYSTEMS

(71) Applicants: Michael Wesley Wood, Cushing, MN (US); Jeffrey Earl Smith, Farmington, MN (US)

(72) Inventors: Michael Wesley Wood, Cushing, MN (US); Jeffrey Earl Smith, Farmington, MN (US)

(73) Assignee: Johnson Outdoors Marine Electronics, Inc., Eufaula, AL (US)

( * ) Notice: Subject to any disclaimer, the term of this patent is extended or adjusted under 35 U.S.C. 154(b) by 0 days.

(21) Appl. No.: 13/904,763

(22) Filed: May 29, 2013

(65) Prior Publication Data

US 2013/0268190 A1    Oct. 10, 2013

Related U.S. Application Data

(63) Continuation of application No. 12/833,907, filed on Jul. 9, 2010, now Pat. No. 8,463,470.

(60) Provisional application No. 61/239,715, filed on Sep. 3, 2009, provisional application No. 61/239,717, filed on Sep. 3, 2009.

(51) Int. Cl.
   *G06T 11/20*    (2006.01)

(52) U.S. Cl.
   USPC .......................................................... 701/21

(58) Field of Classification Search
   USPC .......................................................... 701/21
   See application file for complete search history.

(56) References Cited

U.S. PATENT DOCUMENTS

| | | | |
|---|---|---|---|
| 4,428,052 A | | 1/1984 | Robinson et al. |
| 4,597,069 A | * | 6/1986 | Milano et al. ................... 367/95 |
| 5,172,324 A | | 12/1992 | Knight |
| 5,268,844 A | | 12/1993 | Carver et al. |
| 5,309,408 A | * | 5/1994 | Bick et al. ........................ 367/99 |
| 5,362,263 A | | 11/1994 | Petty |
| 5,386,368 A | | 1/1995 | Knight |
| 5,400,300 A | * | 3/1995 | Bick et al. ........................ 367/99 |
| 5,546,695 A | | 8/1996 | Langer |
| 5,884,213 A | | 3/1999 | Carlson |
| 6,208,758 B1 | | 3/2001 | Ono et al. |
| 6,256,585 B1 | * | 7/2001 | Shannon .......................... 702/2 |
| 6,750,815 B2 | | 6/2004 | Michaelson et al. |
| 6,873,570 B2 | | 3/2005 | Zhu et al. |
| 6,934,608 B2 | | 8/2005 | Qureshi |
| 6,934,657 B1 | | 8/2005 | Carlson et al. |
| 7,124,022 B2 | | 10/2006 | Carmichael et al. |
| 7,209,829 B2 | | 4/2007 | Litvack et al. |
| 7,266,532 B2 | | 9/2007 | Sutton et al. |
| 7,268,703 B1 | | 9/2007 | Kabel et al. |
| 7,313,404 B2 | | 12/2007 | Anderson |
| 7,769,504 B2 | | 8/2010 | Kaji |
| 7,940,602 B1 | * | 5/2011 | Korolenko ................... 367/112 |
| 8,296,001 B1 | | 10/2012 | Kabel et al. |
| 2004/0249860 A1 | | 12/2004 | Stechschulte et al. |

(Continued)

OTHER PUBLICATIONS

U.S. Appl. No. 13/110,587, filed May 18, 2011, Wood et al.

(Continued)

*Primary Examiner* — Thomas Tarcza
*Assistant Examiner* — Alex C Dunn
(74) *Attorney, Agent, or Firm* — Reinhart Boerner Van Deuren P.C.

(57) ABSTRACT

A digital mapping display and related system for fishing, and other applications.

4 Claims, 7 Drawing Sheets

(56) References Cited

U.S. PATENT DOCUMENTS

| | | |
|---|---|---|
| 2006/0089794 A1 | 4/2006 | DePasqua |
| 2009/0037040 A1 | 2/2009 | Salmon et al. |
| 2009/0067750 A1 | 3/2009 | Pryszo et al. |
| 2009/0069962 A1 | 3/2009 | Aharon et al. |
| 2009/0147623 A1 | 6/2009 | Betts et al. |
| 2010/0131133 A1* | 5/2010 | Koda et al. ............ 701/21 |
| 2011/0054784 A1 | 3/2011 | Wood et al. |
| 2011/0054785 A1 | 3/2011 | Wood et al. |
| 2011/0258901 A1 | 10/2011 | Garrett |
| 2012/0015566 A1 | 1/2012 | Salmon |
| 2012/0232719 A1 | 9/2012 | Salmon et al. |

OTHER PUBLICATIONS

U.S. Appl. No. 13/904,709, filed May 29, 2013, Wood et al.

* cited by examiner

SHALLOW WATER HIGHLIGHT METHOD AND DISPLAY SYSTEMS

CROSS-REFERENCE TO RELATED PATENT APPLICATIONS

This patent application is a continuation of co-pending U.S. patent application Ser. No. 12/833,907, filed Jul. 9, 2010, which claims the benefits of U.S. Provisional Patent Application Nos. 61/239,715 and 61/239,717, each of which were filed Sep. 3, 2009, the teachings and disclosure of which are incorporated herein in their entireties by reference thereto.

BACKGROUND OF THE INVENTION

According to the present invention, techniques for digital mapping are provided. In particular, the present invention provides methods, devices, and systems for displaying selected regions of a body of water and associated areas. More particularly, the present invention provides systems, methods, codes, and devices for selectively highlighting one depth or one or more ranges of contiguous depths on the chart of a body of water or varying the depth values for contour lines on such chart on the display of a Global Positioning System (GPS) or coupled to a device of the GPS. As an example, ProMap Technologies, Inc., dba; LakeMasterLake Maps has developed a Chart Library and API that allows GPS manufacturers to embed the API into their OS and thus display proprietary LakeMaster Digital Charts. These LakeMaster Digital Charts reside on a secure SD media card in a format compatible through the API with various GPS Devices. Of course, there can be other variations, modifications, and alternatives.

GPS and underwater sounding devices (SONAR) have made access to navigational charts more readily availability to the angler. Newer charts created with modern technology reach accuracies of within less than one foot for location and depth. Such accuracies allow the creating of highly accurate marine charts capable of depicting the lake bottom in a manner imitating photographic imagery. GPS devices standing alone or coupled with SONAR units have opened a whole new dimension of information available to mariners, anglers and recreational boaters. Data collected during the mapping process has expanded to include not only bottom depth but bottom composition, hardness light penetration, weed growth, periodic tidal or random water level changes together with currents to name some examples.

Although highly successful, GPS devices alone or with SONAR units still have limitations. As an example, such devices are often cumbersome and lack easy to use functions. Without accurate charts that provide easy access to the information they can provide, GPS devices can do little more than allow you to find a previously known point. With accurate charts and user friendly ways to sort and present the information they contain, GPS devices can open entire new worlds of information. Conventional GPS display presentations tend to be static. That is to say, they present information in the same fashion as traditional paper maps. There is no ability to highlight particular features or change the way the chart is presented. Moreover, the conventional GPS device fails to provide ways to modify and display chart data to reflect real time conditions encountered by the user. Additionally, the conventional units do not provide a user with the ability to modify the GPS chart display to reflect potential changes in conditions such as water depth that have or may occur on the water body since the chart was produced.

From the above, it is seen that techniques for improving how GPS and SONAR units present their data are highly desirable.

BRIEF SUMMARY OF THE INVENTION

According to the present invention, techniques for digital mapping are provided. In particular, the present invention provides methods, devices, and systems for displaying charts of selected regions of a body of water and associated areas. More particularly, the present invention provides systems, methods, codes, and devices for selectively highlighting one depth or one or more range of contiguous depths on the chart of a body of water or varying the depth values for contour lines on such chart on the display of a GPS device or GPS. As an example, ProMap Technologies, Inc., dba LakeMaster Lake Maps, has developed a Chart Library and API that allows GPS manufacturers to embed the API into their OS and thus display proprietary LakeMaster® Digital Charts. These LakeMaster Digital Charts reside on a secure SD media card in a format compatible through the API with various GPS devices. Of course, there can be other variations, modifications, and alternatives.

The present invention in several embodiments provides a significant advancement in graphic information presentation techniques. In particular, the techniques provide methods and systems to sort, analyze and display an array of useful information regarding a water body in a GPS map or chart environment. As an example, ProMap Technologies, Inc., has developed a Chart Library Application Programming Interface (API) that allows GPS manufacturers to embed the API into their unit's Operating System and thus display proprietary LakeMaster® Digital Charts. These LakeMaster Digital Charts reside on a secure SD media card in a format initially compatible with conventional GPS devices. In an embodiment, these maps contain bathymetric information that can be sorted and displayed by the embedded API to highlight certain regions of contiguous bottom depth from the shore of the water body as separate from the map of the water body as a whole. Of course, there can be other variations, modifications, and alternatives.

In a specific embodiment, the present invention provides a method for identifying shallow water regions by a graphical output of a depiction of at least one selected area of a body of water to a Global Positioning System (GPS) device coupled to a display. In a specific embodiment, the display is coupled to a GPS plotter. The method includes capturing position information of a vessel from a global positioning system using at least an antenna device, which is optional. The method also includes retrieving at least one chart of one or more regions of a body of water using at least the position information or from a chart library in memory without any position information from the GPS. The chart comprises a plurality of bottom depths below a surface of the one or more regions of the body of water. The chart is configured to be output on the display. The method includes determining a lower limit value of bottom depths associated with a shallow water region be highlighted on the display simultaneously with the chart and inputting the lower limit value of the bottom depths to be highlighted. The method also identifies a shallower contiguous region on the chart between the surface of the body of water and the lower limit value and simultaneously outputs one or more indications representative of the shallower contiguous region with the chart on the display to highlight the shallow water region.

In a specific embodiment, the present invention provides a system for displaying a graphical output of one or more shallow water regions of a body of water. The system includes one or more computer readable memories including various codes. A first code is directed to store capturing position information of a vessel from a global positioning system using at least an antenna device in an optional embodiment. A second code directed to retrieve at least one chart of one or more regions of a body of water from a chart library. The chart comprises a plurality of bottom depths below a surface of the one or more regions of the body of water. The chart is configured to be output on the display. The memory also has a third code directed to receive a lower limit value of bottom depths associated with a shallow water region be highlighted on the display simultaneously with the chart and a fourth code directed to store the lower limit value of the bottom depths to be highlighted. The memory has a fifth code directed to identify a shallower contiguous region on the chart between the surface of the body of water and the lower limit value and a sixth code directed to outputting one or more indications representative of the shallower contiguous region with the chart on the display to highlight the shallow water region.

In still an alternative embodiment, the present invention provides a system for displaying a graphical output of one or more shallow water areas of a body of water. The system has a display and one or more graphical representations of one or more regions of a body of water. The system has one or more labeled contour lines representative of an interface between land and the one or more regions of the body of water and a plurality of labeled contour lines representative of respective plurality of bottom depths below the surface of the one or more regions of the body of water. The system has a first output of a highlighted hazardous or highlighted shallow water region, which may be between a shoreline of the body of water and a lower limit value or a second output free of the highlighted hazardous or highlighted shallow water region, which may be between the shoreline of the body of water and the lower limit value.

Many benefits are achieved by way of the present invention over conventional techniques. In one or more embodiments, the present invention provides for improved display features coupled to a GPS Display Device. In other embodiments, the present method and system may be configured on commercial fish finders or the like. The present invention provides a user friendly method of customizing a chart display in real time to reflect current physical characteristics of the water body. Depths may be dynamically adjusted to allow for changing water lever conditions. Specific physical features of interest to the user can be highlighted in real time based on user inputs. Because the display is controlled by user input, rather than relying on predetermined parameters, broader flexibility for display of charts can be achieved thereby greatly expanding the utility of digital GPS charting in general. Further benefits can be achieved by allowing user to create artificial conditions and display possible results for different field conditions. Physical characteristics of a water body can then be viewed displaying the dynamically created conditions prior to their actual occurrence, allowing users to adjust strategies accordingly. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

Figure 1:
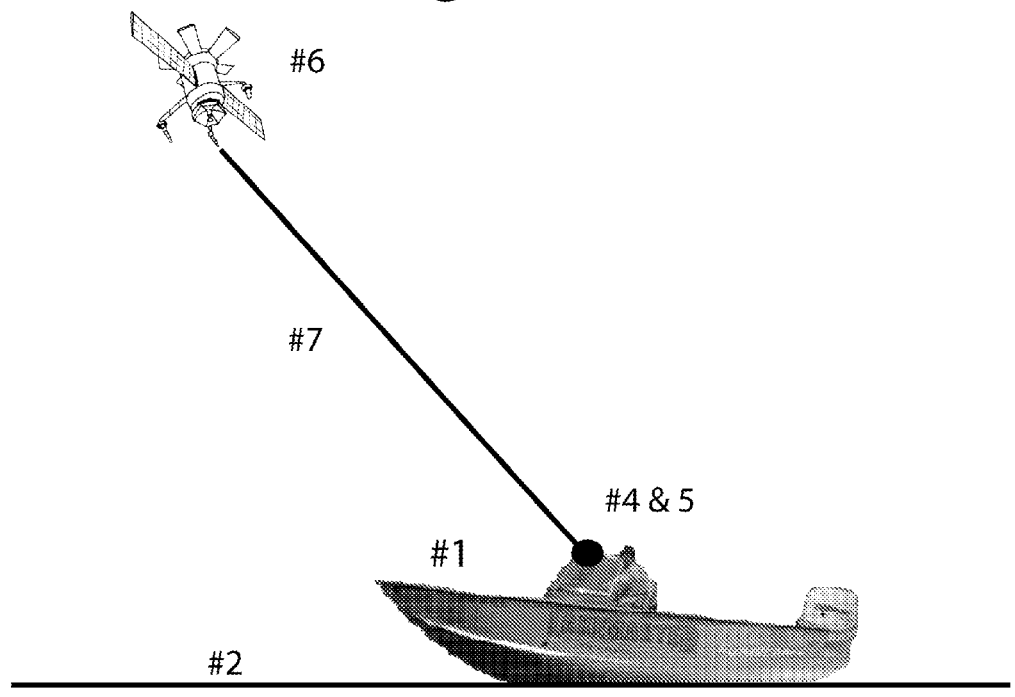
FIG. 1 is a simplified diagram of a vessel with a GPS Display Device apparatus according to an embodiment of the present invention.
Figure 1:
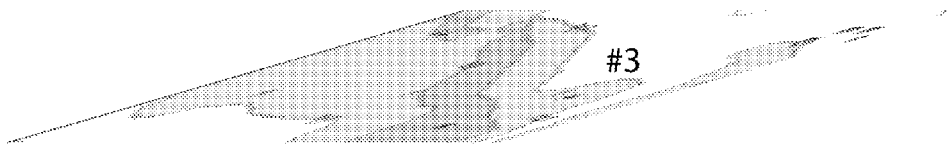

According to the present invention, techniques for digital mapping are provided. In particular, the present invention provides methods, devices, and systems for displaying charts of selected regions of a body of water and associated areas. More particularly, the present invention provides systems, methods, codes, and devices for selectively highlighting one or more depths on a chart of a body of water using a display coupled to a GPS Display Device or GPS. As an example, ProMap Technologies, Inc., dba LakeMaster Lake Maps, has developed a Chart Library and API that allows GPS manufacturers to embed the API into their OS and thus display proprietary LakeMaster® Digital Charts. These LakeMaster Digital Charts reside on a secure SD media card in a format compatible through the API with various GPS devices or GPS Display. Of course, there can be other variations, modifications, and alternatives.

As used herein, the above definitions are merely examples. There can be other variations, modifications, and alternatives and meanings consistent with those interpretations known in the art.

"API" means application programming interface.

"Chart or alternatively Map" means the individual image to be displayed on a GPS Display Device. The chart may be composed from either vector or raster graphical sources. The vector based chart would be composed from encoded vectors and points arranged into a chart image with specifically encoded components which can be manipulated according to user inputs to achieve the modifications of a visual display controlled by the user and displayed on a GPS device at its true geographical world coordinate(s). The raster chart may be composed as a fixed image or as in this embodiment may be dissected into pixels, lines or polygons of varying colors. Those individual components of the raster image are then encoded thus creating an image which can be manipulated according to user inputs to achieve the modifications of a visual display controlled by the user and displayed on a GPS device at its true geographical world coordinate(s). Of course, there can be other meanings consistent with those known by one of ordinary skill in the art.

"Chart Library" means a collection of subroutines and/or routines that contain code, images and data to provide services to independent programs.

"Contour Line" means one or more lines depicting a contiguous or semi-contiguous area of the bottom of a water body being at the same depth below the surface or a line depicting a transition between two differing areas of bottom composition, bottom hardness, weed growth or current flow.

"GPS device" means Global Positioning System capable of using satellite signals to locate the current position of the GPS device or a location selected by a user and providing a positional related output to create a visual representation of specified geographic locations coupled with a map of the surrounding area.

"GPS/Sonar Combination Unit" (Combo Unit) means one or more configurations of GPS devices with visual displays capable of displaying inputs from GPS and Sonar units on a single integrated display.

"GPS Display Device" means a visual display device in one or more configurations of GPS or Combo unit.

"Map Media Cards" means any form of electronic media mass storage device or media card capable of storing digital information and allowing access to such information by a digital processor.

"Human Interface" means any method by which a human user is able to input specific values (data) into a GPS device to among other functions dynamically change the appearance of the visual display in a predetermined manner or provide other user inputs necessary to manipulating the visual image of a chart on the display of the GPS device.

"Shaded" means cross-hatch, dotted, or other fill methods for regions and any and all forms of line or shading depiction.

"Raster" and "Vector" relate to techniques of processing data for display on the GPS device, or in any GIS environment. As an example, raster format basically stores a set of images that are "pinned" to a geographic location on the earth. When the GPS location data is input into the GPS software, the image is called up and displayed on the screen. Vector format has discrete points individually coded with geographic location information. That information is output to a program which literally draws the geographic image and then places it on a screen.

As used herein, the above definitions are merely examples. There can be other variations, modifications, and alternatives and meanings consistent with those interpretations known in the art.

Figure 2:
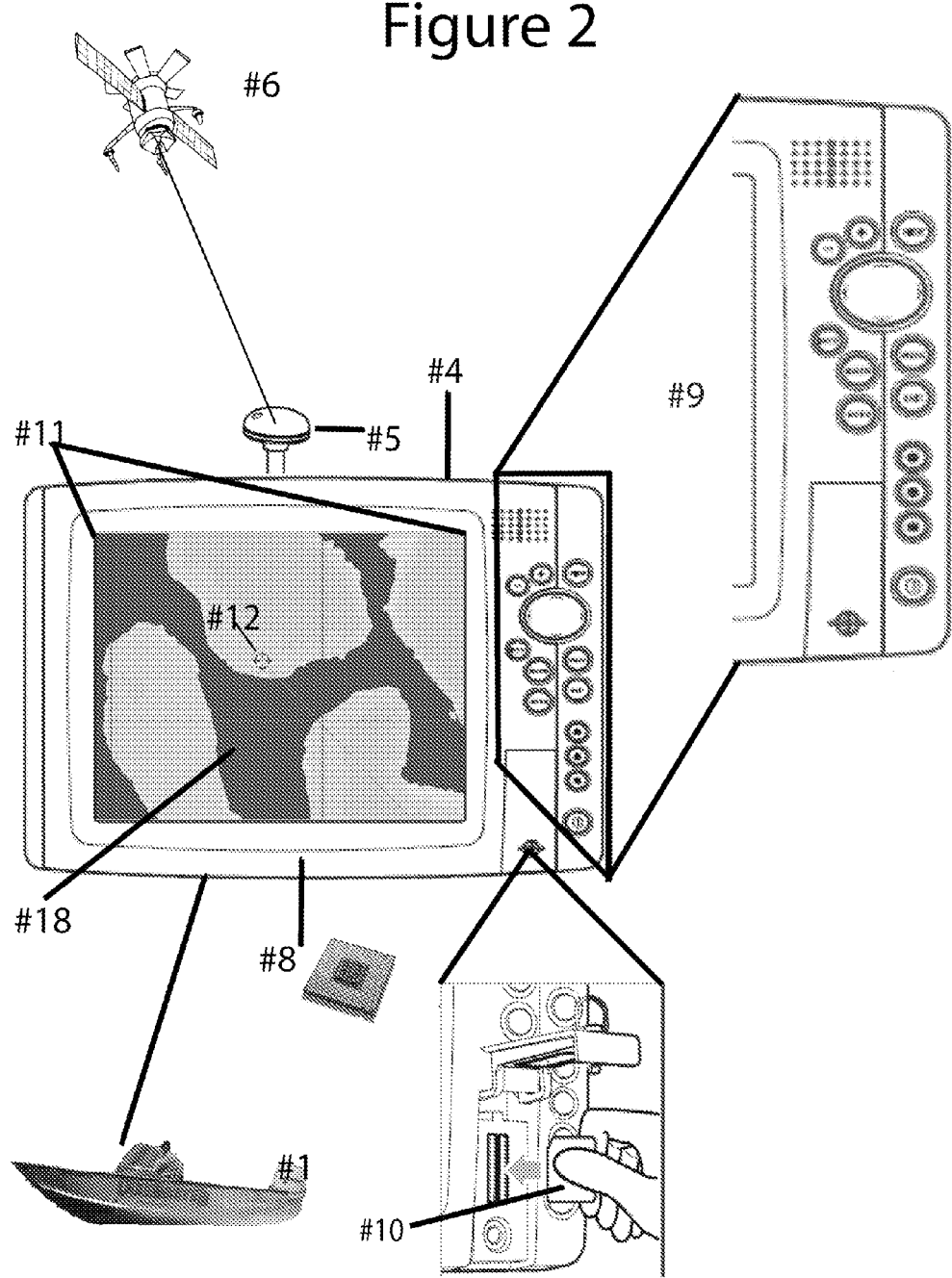
FIG. 2 is a simplified diagram of the GPS Display Device apparatus according to an embodiment of the present invention.
Figure 3:
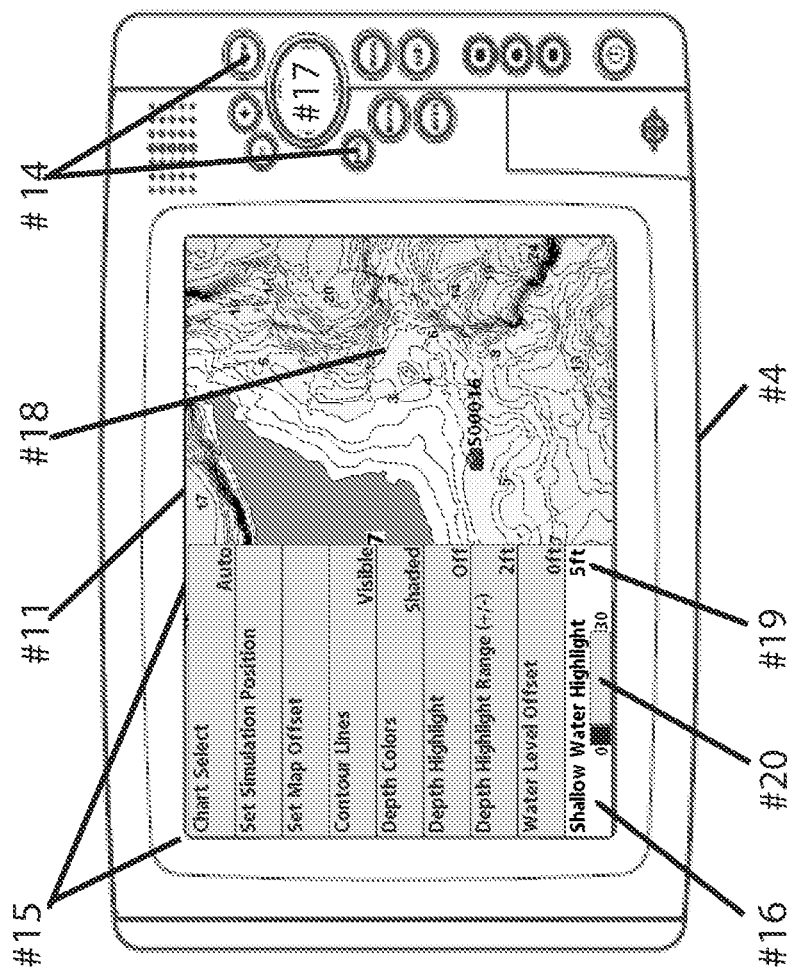
FIG. 3 is a simplified diagram illustrating a shallow water highlight feature according to embodiments of the present invention.
Figure 4:
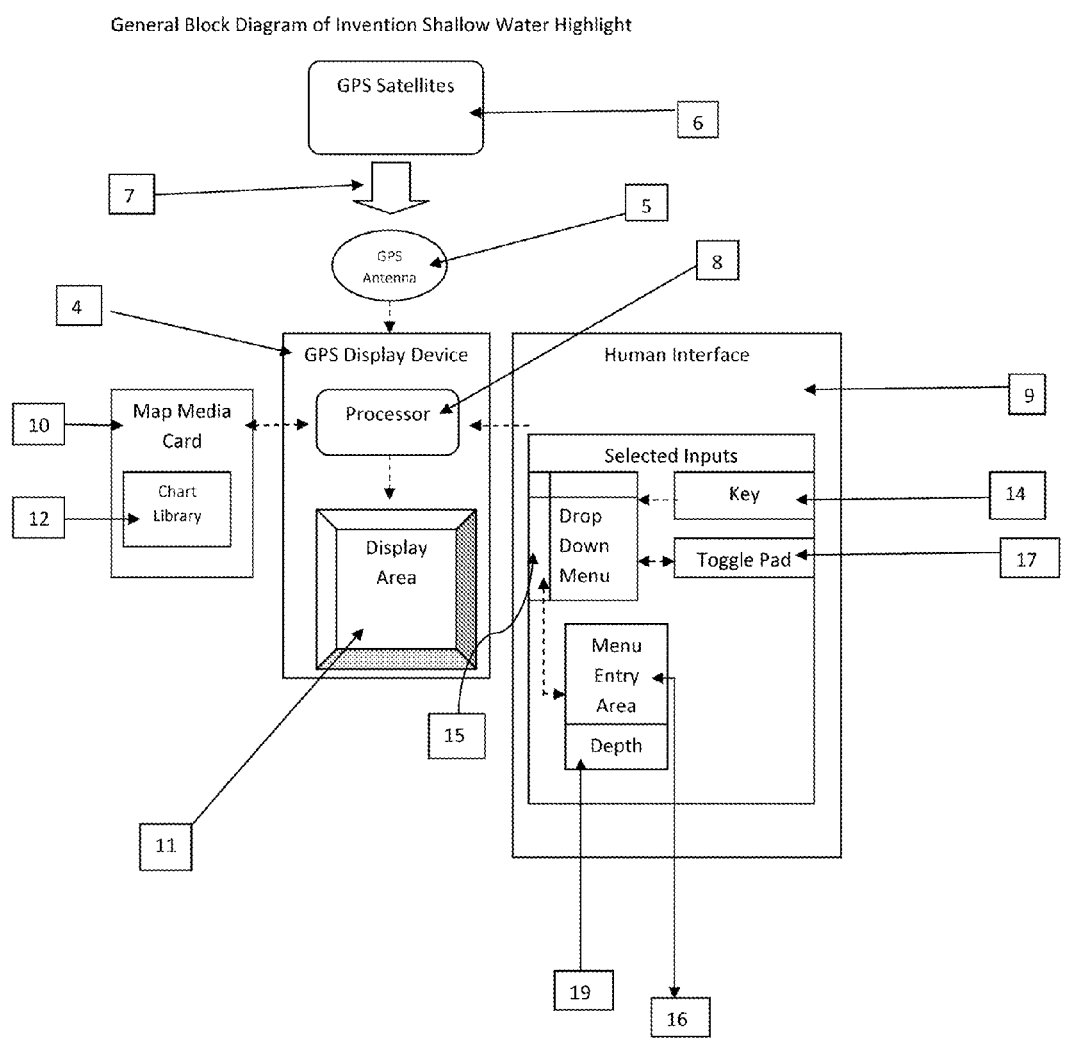
FIG. 4 is a simplified block diagram according to the shallow water highlight feature according to an embodiment of the present invention.

Referring to FIGS. 1, 2, and 4, a vessel, shown as a watercraft 1, on a surface 2 of a body of water 3 employs a GPS Display Device 4 mounted on the watercraft 1 connected to a GPS antenna 5. GPS satellites 6 in geosynchronous orbits continuously transmit signals 7 that are received by the antenna 5 and transmitted to the GPS Display Device 4. The GPS Display Device 4 system includes the antenna 5 connected to a GPS Display Device 4 that has a processor 8, a Human Interface 9, in the present embodiment, one or more preprogrammed Map Media Cards 10 containing digital records in the form of a Chart Library 12 and a visual display area 11. The processor 8 repetitively processes the signals from the satellites 6 to determine the position of the watercraft 1. In other embodiments, the antenna device may repeated process signals from the satellites to determine the position of the watercraft. The processor 8, using this position information determines the correct visual map image to retrieve from the Chart Library 12 on the Map Media Card 10 to display in the visual display area 11. In correct or selected visual map is one of a plurality of maps in the Chart Library. The processor then retrieves any user pre-sets inputted through the Human Interface 9 to modify the map image retrieved from the Map Media Card 10 to create a modified map image. The processor 8 then places the modified map image 18 in the visual display area 11. Of course the visual display area can alternatively display the modified map 18 for any location the user may choose to determine.

Referring to FIGS. 1, 2, 3, and 4, in an embodiment using information obtained from external sources, the user selects a depth for input to the device, namely the minimum depth the user wants to highlight for operation of their vessel or at which to fish. In the present embodiment the user selects a drop down menu 15 by pressing the correct key 14 in combination with the toggle pad 17 in the Human Interface 9. The user then selects a menu entry area 16 from the drop down menu using a toggle pad 17 and correct key 14. By moving a slid bar 20 in the menu entry area using a toggle pad 17, the user selects the desired depth 19. The processor 8 repetitively processes the signals 7 from the satellites 6 to determine the position of the watercraft 1. The processor 8, using this position information determines the correct visual map image to retrieve from the Chart Library 12 on the Map Media Card 10. Based on this user input, the processor 8 modifies the map image retrieved from the Chart Library 12 to highlight all areas of the retrieved map image shallower than the selected depth. The processor 8 then places the modified map image 18 in the visual display area 11. Alternatively, the Human Interface 9 may have switches or push buttons, or any of a variety of mechanical input elements, display menus and depth selection techniques. Of course the visual display area can alternatively display the modified map 18 for any location the user may choose to determine.

In one or more embodiments, certain functionality of the present Chart Library API is novel and unique GPS plotter technology as applied to the fishing and boating industry according to one or more embodiments. The functionality is provided to the API and is thus applicable to any unit that can access the API. In a specific embodiment, the present method and system are directed to a shallow water highlight feature. Other techniques for mapping have been described in co-pending U.S. patent application Ser. No. 12/833,919, entitled, "DEPTH HIGHLIGHT, DEPTH HIGHLIGHT RANGE, AND WATER LEVEL OFFSET HIGHLIGHT DISPLAY AND SYSTEMS," commonly assigned, and hereby incorporated by reference for all purposes.

All of the above functions and graphic primitives that allow those functions to be displayed on a GPS screen are resident in one or more codes in a specific embodiment. The GPS manufacturer often provides the Operating System Menu Options that allow these functions to be turned on or off and be incrementally adjusted using a slide tool bar. Of course, there can be other variations, modifications, and alternatives.

The following screen captures showing the display functionality taken from a GPS/Sonar unit are further described throughout the present specification and more particularly in the accompanying text.

The following screen captures showing the display functionality taken from a GPS Display Device are further described throughout the present specification and more particularly in the accompanying text.

Figure 5:
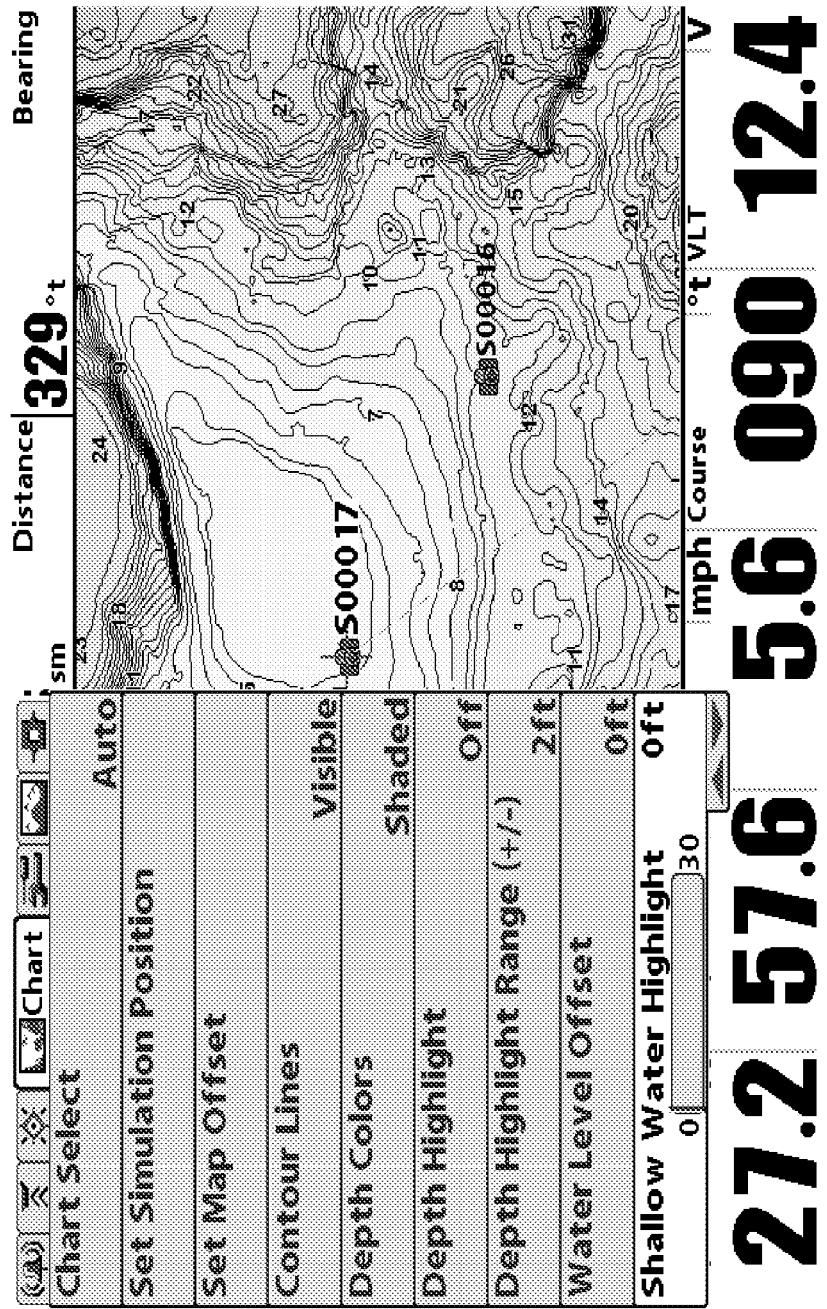
FIGS. 5 thru 7 are simplified GPS map images as they appear in the visual display area of a GPS Display Device in one or more embodiments of the present invention.
Figure 6:
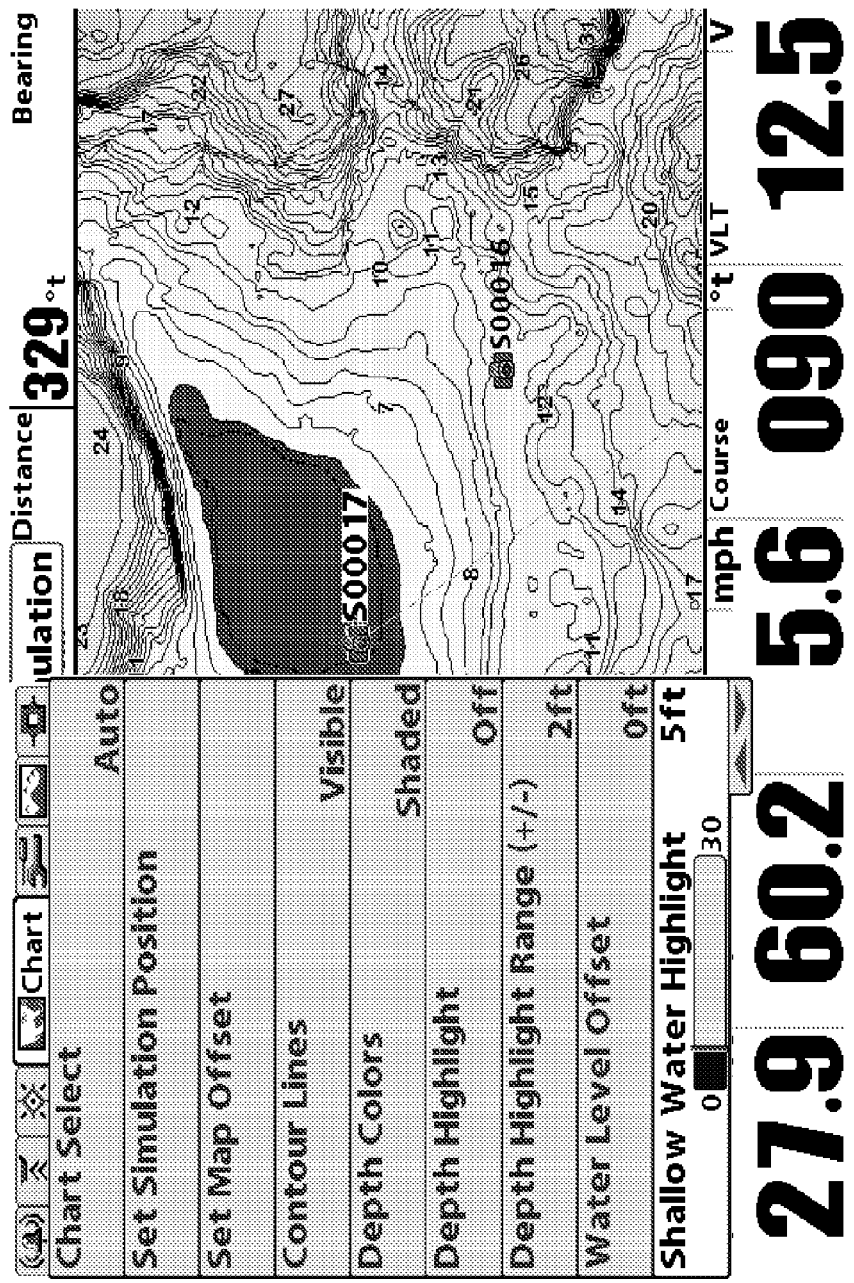
Figure 7:
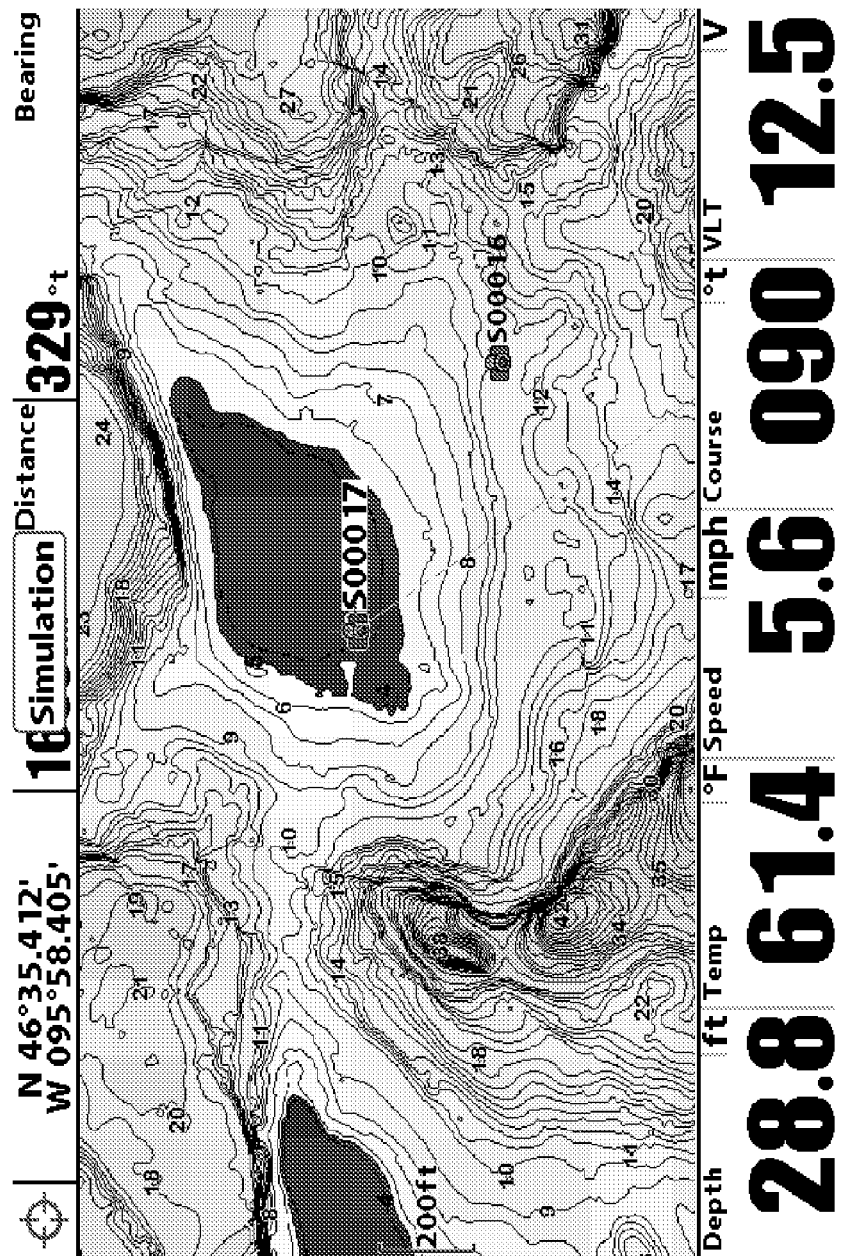

In a specific embodiment, the present method and system serves to enhance a chart by highlighting shallow water areas for easier and safer navigation. SWH allows the navigator the ability to highlight in red any depth range starting with zero down to a safe navigation depth on the visible map. The SWH tool allows the navigator to highlight water to a maximum depth of 30 feet, as shown in FIGS. 5 and 6. An example of SWH Function rendering all depths on chart from zero to 5-feet deep in red, as shown in FIG. 7.

In other embodiments, the method (and system) has other variations. That is, the one or more indications are selected from at least a shaded region, a flashing region, a broken contour line, a flashing contour line, a solid line, a broken line, or a series of symbols. Additionally, the one or more indications are associated with differentiated spatial regions selected from one or more contour lines differentiated from at least one of the remaining contour lines, one or more shaded regions differentiated from at least one of the remaining regions or one or more colored regions differentiated from one of the remaining regions. The one or more indications are associated with one or more colored contour line labels, one or more shaded contour line labels, one or more flashing contour line labels, or one or more differentiated contour line labels. In a specific embodiment, the one or more indications are associated with one or more separate routes.

In other embodiments, the method includes an alarm process. The method includes moving the vessel into the shallow water region and outputting an alarm signaling entry of the vessel into the shallow water region. In a specific embodiment, the alarm signal may be a flashing display, audio sound from a speaker, or a combination of both, or even shut off the vessel in some embodiments. Of course, there are other variations, modifications, and alternatives.

In a specific embodiment, there are other variations. The outputting is provided in two dimensions or three dimensions. The outputting of the one or more indications is provided simultaneously with the chart. In a specific embodiment, the inputting of the lower limit value comprises selecting an indication associated with a numerical value through a user interface provided on the display. The inputting of the lower limit value comprises moving a slide bar on a user interface provided on the display or using a voice command coupled to the display. The inputting also may occur using a first key pad or first toggle coupled to the GPS device or using second key pad or second toggle separate and apart from the GPS device. In a specific embodiment, the body of water is selected from a lake, an ocean, a bay, a river, a reservoir, an impoundment, a pond, and a stream. Additionally, the chart further comprises one or more spot depths or the chart comprises at least one continuous depth contour line at the lower limit value. In one or more embodiments, the lower limit value is associated with a structure, which may be a hazard to the vessel.

Types of charts available to apply these tools to may vary from region to region in specific embodiments. There are basically to types of charts, Standard Definition (SD) and High Definition (HD). Standard Definition charts are most often displayed in 5-foot depth intervals with contour depth lines for every 5-foot of depth. High Definition charts are available in 1-foot depth intervals (most common and described earlier) or a chart with 3-foot depth intervals. Viewing a 3-foot Hi-Def or a 5-foot Standard Depth chart and applying the Shallow Water Highlight tools will have varying results. Selecting a Shallow Water Highlight not common to the chart will result in a rendered chart with values rounded up or down to the nearest contour line or interval of that chart.

For example, when viewing a 3-foot chart and selecting a 10-foot Shallow Water Highlight, the entire interval between 0 and 12 will be highlighted.

In a specific embodiment, the system can include common hardware and/or software elements. As an example, the system includes a monitor or display, and an associated computing system, which is included and/or coupled to the GPS system and/or depth locator system, e.g., SONOR or fish finder system. The computing system preferably includes familiar components such as a processor or processors as noted, and memory storage devices, such as a random access memory (RAM), a fixed disk drive or flash memory, and a system bus interconnecting the above components. The RAM and fixed disk drive or flash drive are mere examples of tangible media for storage of computer programs, audio and/or video data, and code implementing embodiments of the present invention. Other types of tangible media include SRAM, floppy disks, optical storage media such as CD-ROMs and bar codes, semiconductor memories such as flash memories, read-only-memories (ROMs), ASICs, battery-backed volatile memories, and the like, and combinations.

In a specific embodiment, the system can also include a network interface to a computer network, which may be a short range network, wide area network or local area network or combination. Of course, there can be other variations, modifications, and alternatives. The system above discloses examples of configurations that embody the present invention. It will be readily apparent to one of ordinary skill in the art that many system types, configurations, and combinations of the above devices are suitable for use in light of the present disclosure. Of course, the types of system elements used depend highly upon the application.

While the above is a full description of the specific embodiments, various modifications, alternative constructions and equivalents may be used. Also, as used herein, the terms "first" "second" "third" and others do not imply order but shall be interpreted as ordinary meaning and can mean any order. Therefore, the above description and illustrations should not be taken as limiting the scope of the present invention which is defined by the appended claims.

What is claimed is:

1. A method of displaying a depiction of an area of a body of water on a display, the method comprising the steps of:
   receiving a user selection of a shallow water depth to be highlighted on the depiction of the area of the body of water on the display;
   determining at least one shallow water region to be highlighted on the display that is shallower than the shallow water depth; and
   outputting one or more indications representative of the at least one shallow water region on the display to highlight the at least one shallow water region.

2. The method of claim 1, wherein the step of determining at least one shallow water region to be highlighted on the display that is shallower than the shallow water depth comprises the step of determining at least one shallow water region to be highlighted on the display that is shallower than a contour line on a chart of the body of water that is next deeper than the shallow water depth.

3. A method of providing a visual navigational aid on a chart of at least a portion of a body of water displayed on a display, comprising the steps of:
   setting a shallow water highlight depth;
   determining at least one contiguous shallow water region to be highlighted on the display that is shallower than the shallow water highlight depth based on contour lines contained on the chart; and
   outputting one or more indications representative of the at least one contiguous shallow water region on the display to highlight the at least one shallow water region.

4. The method of claim 3, wherein the step of determining at least one contiguous shallow water region to be highlighted on the display that is shallower than the shallow water highlight depth based on contour lines contained on the chart comprises the step of including a next deeper contour line relative to the shallow water highlight depth in the shallow water region.

* * * * *